(12) United States Patent
Baeckler

(10) Patent No.: US 8,918,682 B2
(45) Date of Patent: Dec. 23, 2014

(54) METHODS FOR TESTING NETWORK CIRCUITRY

(71) Applicant: Altera Corporation, San Jose, CA (US)

(72) Inventor: Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 226 days.

(21) Appl. No.: 13/676,467

(22) Filed: Nov. 14, 2012

(65) Prior Publication Data
US 2014/0136905 A1    May 15, 2014

(51) Int. Cl.
*G06F 11/00*    (2006.01)
*G06F 11/07*    (2006.01)

(52) U.S. Cl.
CPC ..................... *G06F 11/07* (2013.01)
USPC .................. 714/57; 714/25; 714/43

(58) Field of Classification Search
CPC ............................. G06F 11/107; H04L 43/18
USPC ................................ 714/57, 43, 25
See application file for complete search history.

(56) References Cited

U.S. PATENT DOCUMENTS

| 5,809,282 | A | | 9/1998 | Cooper et al. | |
|---|---|---|---|---|---|
| 5,822,520 | A | * | 10/1998 | Parker | 709/230 |
| 6,105,068 | A | * | 8/2000 | Naudus | 709/228 |
| 6,108,309 | A | | 8/2000 | Cohoe et al. | |
| 6,330,005 | B1 | * | 12/2001 | Tonelli et al. | 715/735 |
| 6,957,396 | B2 | | 10/2005 | Iwamura | |
| 2004/0098641 | A1 | * | 5/2004 | Sirbu | 714/43 |
| 2006/0015576 | A1 | * | 1/2006 | Seo et al. | 709/219 |
| 2007/0047448 | A1 | * | 3/2007 | Chiu et al. | 370/241 |
| 2012/0230208 | A1 | * | 9/2012 | Pyatkovskiy | 370/250 |
| 2013/0275811 | A1 | * | 10/2013 | Wong et al. | 714/37 |

* cited by examiner

*Primary Examiner* — Yolanda L Wilson

(57) ABSTRACT

A method of operating a test equipment system that is coupled to network circuitry is described. The method displays only selected information. Furthermore, the method may display the selected information in a manner as to allow a user of the test equipment to easily identify errors in the network circuitry. The method may select the information to be displayed by processing received signals according to a stacked protocol hierarchical structure.

20 Claims, 6 Drawing Sheets

METHODS FOR TESTING NETWORK CIRCUITRY

BACKGROUND

Generally, interconnect circuitry on a communication network is built according to a standard networking protocol. The networking protocol may include various protocol layers. The protocol layers may be stacked hierarchically. One of the more common standard networking protocols is based on the Open System Interconnections (OSI) model.

Among the standard networking protocols, there may be protocols to transmit or receive data. Such protocols are usually implemented on an integrated circuit. Typical protocols for transmitting or receiving include, among others, the Interlaken, Ethernet, and Scalalable Serdes Framer Interface (SFI-S) protocols. The signal transmission and reception protocols may be implemented using serializer/deserializer (SERDES) circuitry, which is available on the integrated circuit.

In practice, the SERDES circuitry may encounter a wide range of errors. The errors may be detected using various test equipments. However, existing test equipments may output an unmanageable amount of data to the user. Providing massive amounts of data is counterproductive and does not facilitate the process of pinpointing an error within the network system. Furthermore, the massive amount of data may be difficult and time-consuming to analyze.

It is within this context that the embodiments described herein arise.

SUMMARY

Embodiments described herein include methods for operating a test equipment that is coupled to network circuitry. It should be appreciated that the embodiments can be implemented in numerous ways, such as a process, an apparatus, a system, a device, or a method. Several embodiments are described below.

In one embodiment, a method of operating a test equipment system that is coupled to network circuitry is described. The method displays only selected information. Furthermore, the method may display the selected information in a manner as to allow a user of the test equipment to easily identify errors in the network circuitry. The method may select the information to be displayed by processing received signals according to a stacked protocol hierarchical structure.

In one embodiment, a method of operating a test equipment system that is coupled to network circuitry is described. The method includes receiving signals from network circuitry that has first and second network protocol layers (e.g., a physical layer and a data link layer). Next, the test equipment determines whether the received signals associated with the first network protocol layer exhibit any error. If the signals associated with the first network protocol layer exhibit any error, the test equipment displays status information for the first network protocol layer without displaying the status information of the second network protocol layer.

In another embodiment, another method of operating test equipment that is coupled to network circuitry is described. The method includes receiving signals from network circuitry that implements a network protocol stack with a plurality of network protocol layers. Next, the test equipment determines whether the received signals that are associated with one of the network protocol layers in the plurality of network protocol layers exhibit any errors. If the received signals exhibit any errors, the test equipment displays status information of only that particular network protocol layer on a graphical user interface in the test equipment.

In an alternative embodiment, a non-transitory computer-readable storage medium implemented on test equipment for displaying status information for network circuitry is described. The non-transitory computer-readable storage medium includes instructions to receive signals from the network circuitry with a test equipment. The network circuitry may include a network protocol stack having a plurality of network protocol stack layers. The non-transitory computer-readable storage medium may further include instructions to display status information for a single network protocol layer in the plurality of network protocol stack layers on a graphical user interface running on the test equipment. In another embodiment, a computer system having a central processing unit, a display, a keyboard and the above described non-transitory computer-readable storage medium is also provided.

Further features of the invention, its nature and various advantages will be more apparent from the accompanying drawings and the following detailed description of the preferred embodiments.

DETAILED DESCRIPTION

The following embodiments describe a method to operate a test equipment that is coupled to network circuitry. It will be obvious, however, to one skilled in the art, that the present exemplary embodiments may be practiced without some or all of these specific details. In other instances, well-known operations have not been described in detail in order not to unnecessarily obscure the present embodiments.

Figure 1:
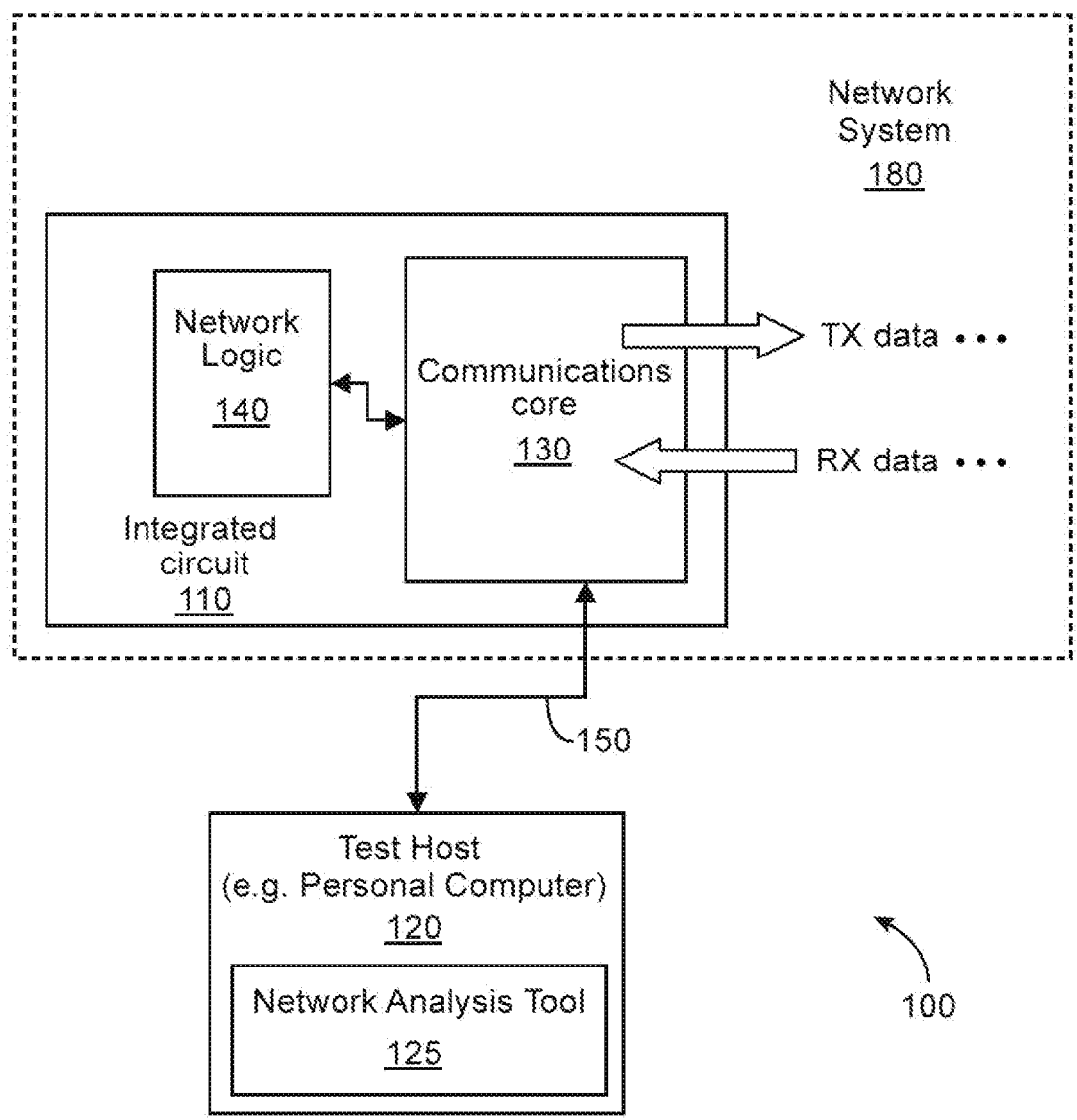
FIG. 1 shows an illustrative test system for testing a network system in accordance with one embodiment of the present invention.

FIG. 1, meant to be illustrative and not limiting, illustrates a test system for testing a network system in accordance with one embodiment of the present invention. Test system 100 includes network system 180, test host 120 and interconnect 150. The arrangement within test system setup 100 may be utilized for analyzing signals that are received from network system 180. The status of network system 180 may be determined by analyzing the received signals. The status may refer to a condition of network system 180 reflective of any errors within network system 180. In one embodiment, the received signals may be associated with layers of a multilayered network protocol. Therefore the received signals may be analyzed on a layer-by-layer basis in order to provide selected status information to a user of test system 100. Test system 100 may also include other circuitry (the details of which are not illustrated in FIG. 1), such as, a microprocessor device, memory devices, optical modules, etc.

Network system 180, in one embodiment, may be modeled according to the Open System Interconnection (OSI) model. Typically, the OSI model includes seven network protocol layers. The seven network protocol layers may be stacked to form a hierarchy with the physical layer (PHY) at the first and lowest level, and the application layer at the seventh and highest level in the hierarchy.

In the embodiment of FIG. 1, network system 180 includes integrated circuit 110. Integrated circuit 110 may include networking logic 140 and communication core 130. Networking logic 140 may include circuitry to perform functions such routing, data packet generation, etc. Therefore, in one embodiment, networking logic 140 may include signal routing circuitry. Communication core 130 may process the signals received from other circuitry in network system 180. Therefore, communication core 130 may include signal processing circuitry, such as, microprocessor circuitry. In one embodiment, networking logic 140 and communication core 130 may implement a standard network protocol, such as, the Ethernet protocol, the Interlaken protocol, etc., on integrated circuit 110.

In one embodiment, integrated circuit 110 may be a Field Programmable Gate Array (FPGA) device. The FPGA device may include a plurality of programmable logic elements that are programmable to perform various functions. Therefore, networking logic 140 and communication core 130 in the FPGA device may be implemented using programmable logic elements. In another embodiment, integrated circuit 110 may be an Application Specific Integrated Circuit (ASIC) device or an Application Specific Standard Product (ASSP) device. Accordingly, networking logic 140 and communication core 130 in the ASIC or ASSP device may be implemented with hard logic circuitry.

Still referring to FIG. 1, integrated circuit 110 may also include interface circuitry (not shown in FIG. 1). The interface circuitry may include transmitter circuitry and receiver circuitry. The interface circuitry may couple integrated circuit 110 to other circuitry within network System 180. The transmitter circuitry of integrated circuit 110 may transmit signals from integrated circuit 110 whereas the receiver circuitry of integrated circuit 110 may receive signals from other circuitry in network system 180. The receiver circuitry may further include other circuitry such as clock and data recovery (CDR) circuitry and phase-locked loop (PLL) circuitry. The interface circuitry in integrated circuit 110 may be based on a standard protocol, e.g., the Ethernet protocol, the Interlaken protocol, etc. It should be appreciated that the transmitter circuitry and the receiver circuitry may Include a plurality of Serializers/Deserializers (SERDES) circuitry. In one embodiment, integrated circuit 110 includes at least twenty SERDES channels.

Test host 120 may be a special purpose or a general purpose computer device that may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, network PCS, minicomputers, mainframe computers, and the like. An illustrative example of test host 120 may be provided in FIG. 2.

In the embodiment of FIG. 1, test host 120 is coupled to integrated, circuit 110 through interconnect 150. Interconnect 150 may include a plurality of signal pathways. It should be appreciated that the number of signal pathways in interconnect 150 may depend on the type of communication protocol used between integrated circuit 110 and test host 120. In the embodiment of FIG. 1, signals from communication core 130 in integrated circuit 110 may be transmitted to test host 120 through interconnect 150.

In one embodiment, test host 120 communicates with integrated circuit 110 using a standard, protocol, for example, the Universal Serial Bus (USB) protocol, the Peripheral Component Interconnect (PCI) Express protocol, etc. As such, test host 120 may also include interface circuitry (not shown in FIG. 1) that transmits and receives signals based on the standard protocol used.

In the embodiment of FIG. 1, test host 120 includes network analysis tool 125. The signals received by test host 120 are processed by network analysis tool 125. In one embodiment, network analysis tool 125 may analyze the signals based on method 300 in FIG. 3 and may display the status of or problems with network system 180 on a display unit within test host 120. The displayed status may be used by the user of test host 120 for troubleshooting network system 180. In one embodiment, network analysis tool 125 may include computer-executable instructions that perform method 300 of FIGS. 3A and 3B.

It should be appreciated that computer-executable instructions may include program modules that may be executed by a personal computer or a server. Generally, program modules include routines, programs, objects, components, data structures, etc., that perform particular tasks or implement particular abstract data types. Typically, the functionality of the program modules may be combined or distributed as desired in various environments. Computer-executable instructions, in this embodiment, process the signals received from integrated circuit 110 according to a particular task and display the status of network system 180 accordingly.

Figure 2:
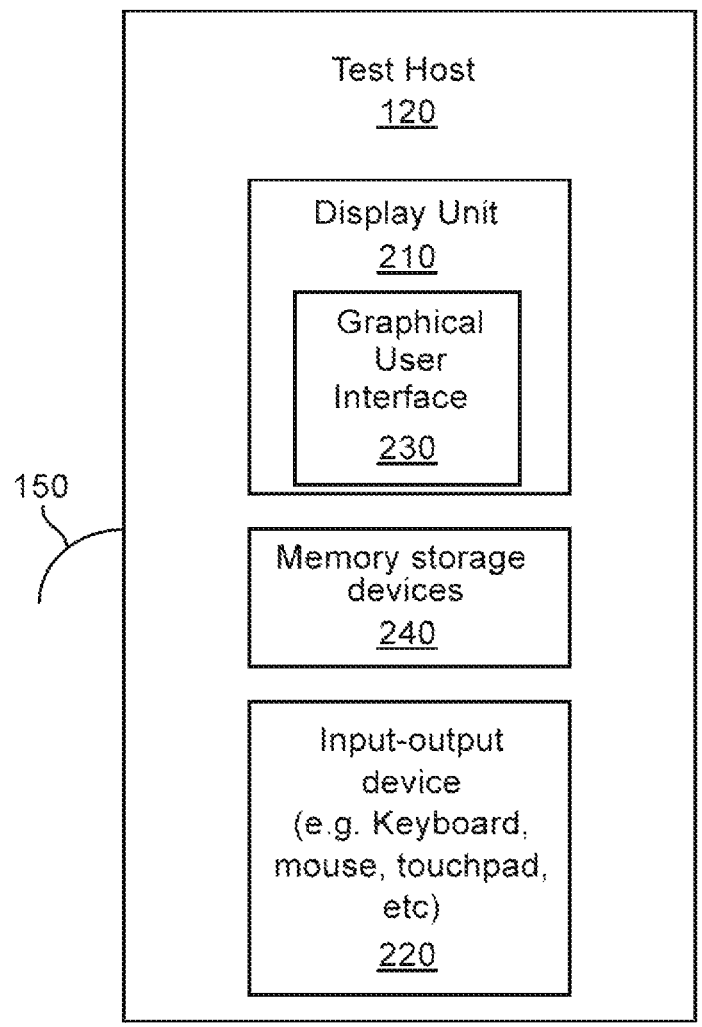
FIG. 2 shows an illustrative test host for testing a network system in accordance with one embodiment of the present invention.

FIG. 2, meant to be illustrative and not limiting, illustrates an example of test host 120 in accordance with one embodiment of the present invention. Test host 120 include display unit 210, input device 220 and interconnect 150. As described in FIG. 1, test host 120 may be coupled to integrated circuit 110 of FIG. 1 by way of interconnect 150.

In the exemplary embodiment of FIG. 2, input device 220 may include a keyboard, a mouse, a touchpad, etc. Input device 220 allows a user of test host 120 to input data and settings into test host 120. Test host 120 may also include memory storage devices 240, e.g., computer readable media. As an example, such computer readable media may include Random Access Memory (RAM), Read-Only Memory (ROM), Electrically-Erasable Programmable Read-Only Memory (EEPROM), Compact Disc Read-Only Memory (CD-ROM) or other optical disk storage elements, magnetic disk storage or other magnetic storage devices, or any other medium that can be used, to store the desired executable instructions and that can be accessed by a general purpose or special purpose computer. Combinations of the above should also be included within the scope of computer readable media. Such computer readable media may be any available media, which can be accessed by a general purpose or special purpose computer.

It should be appreciated that the computer executable code includes, for example, instructions and data that may cause a general purpose computer, special purpose computer, or special purpose processing device to perform a certain function or group of functions. In one embodiment, the executable instructions may be similar to steps in method 300 (the details of which will be described later with reference to FIGS. 3A and 3B).

In the embodiment of FIG. 2, display 210 may be a screen that provides visual information to a user of test host 120. Display 210 further Includes graphical-user interface (GUI) 230. GUI 230, in one embodiment, provides the status of a network system, such as the status of network system 180 in FIG. 1. In one embodiment, GUI 230 may be similar to GUI 400 of FIG. 4. GUI 230 may also be a part of computer executable instructions that may be stored in any of memory storage devices 240. In one embodiment of the present invention, GUI 230 provides only a portion of the status or problems relevant to the network system to a user of test host 120.

Figure 3A:
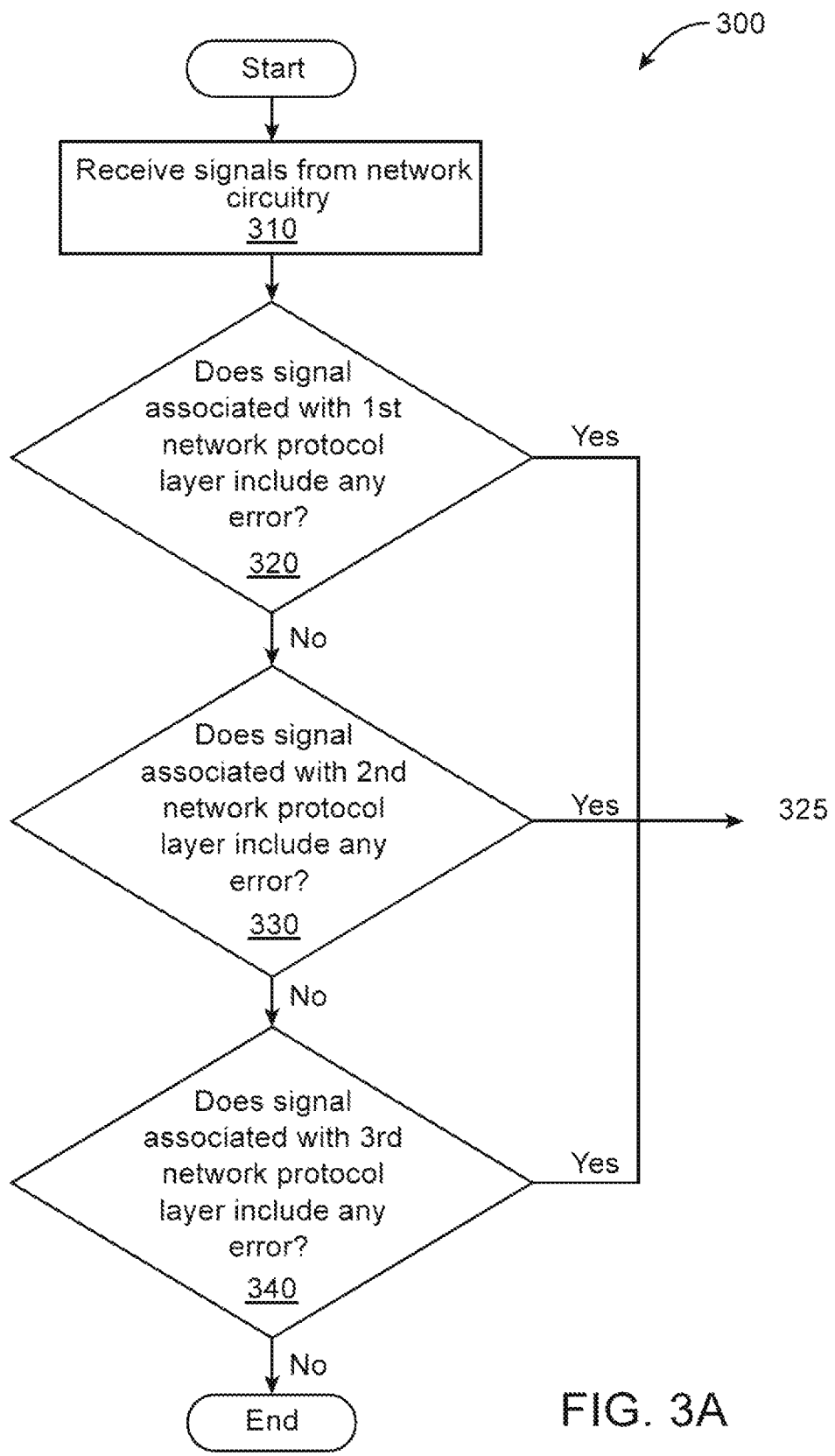
FIGS. 3A and 3B show a method of processing signals received from a network system in accordance with one embodiment of the present invention.
Figure 3B:
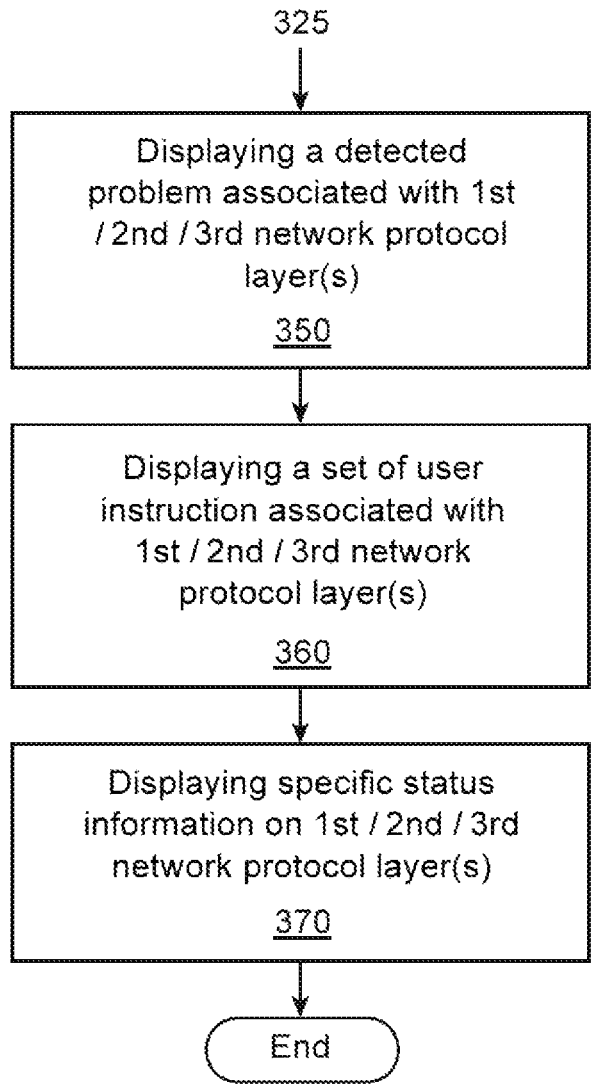

FIGS. 3A and 3B, meant to be illustrative and not limiting, snow a method of processing signals received from a network system in accordance with one embodiment of the present invention. A testing apparatus may be configured or setup according to test system 100 to perform method 300. Therefore, in one embodiment, the network system may be similar to network system 180 of FIG. 1 and the test host system may be similar to test host 120 of FIG. 1. Furthermore, method 300 may be performed by network analysis tool 125 of FIG. 1.

At step 310, signals from the network system are received by the test host system. The signals received by the test host system may be from integrated circuit 110 of FIG. 1, according to one embodiment. It should be appreciated that the signals received by the test host system may correspond to signals generated by the network system in response to a supplied test signal. Furthermore, the signals received by the test host system may be a plurality of bits, frames and/or packets.

The signals received by the test host system may further include clock signal information (e.g., a transmitting clock signal and a receiving clock signal). The signals received by the test host system may also include bit error rate (BER) information of a particular channel in the network system. As described in FIG. 1, the signals received by the test host system can be associated with the respective network protocol layers. For example, a portion of the received signals may be associated with the first network protocol layer whereas another portion of the received signals may foe associated with a second network protocol layer.

At step 320, method 300 determines whether the signals that are associated with the first network protocol layer include any errors. In one embodiment, the first network protocol layer may be a physical layer of the OSI network model. The physical layer, typically, includes transmission hardware of the network system (e.g., interface circuitry that includes transmitting and receiving circuitry). In one embodiment, the physical layer of the network system may include SERDES circuitry. It should be appreciated that if the received signals associated with the first network protocol layer have any errors, signals in the remaining layers of the network protocol layers may be affected. If the signals associated the first network protocol layer have any errors, method 300 may proceed to step 325. However, if the signals that are associated with the first network protocol layer do not have any errors, method 300 may proceed to step 330.

At step 330, method 300 determines whether the signals that are associated with the second network protocol layer have any errors. As described in the embodiment above, when the network system is modeled after the OSI protocol model, the second network protocol layer may be a data link layer. The data link layer, typically, includes functional and procedural means to transfer bit frames across circuitry in the local area of the network system. It should be appreciated that the local area of the network system may be a relatively small area, such, as, a region covered by a local area network (LAN). In one exemplary embodiment, the data link layer protocol may foe an Ethernet protocol and the local network system may be a LAN.

The signals associated with the data link layer may include a plurality of frames that is transferred between different circuit elements in the local network. The frames may include a string of repetitive hits (e.g., 1100110011001100, which has a repeated bit sequence, "1100"). In one exemplary embodiment, errors on the data link layer may be identified when the receiver circuitry in the integrated circuit fails to lock-on with the frames received from another circuitry in the local network system. If the receiver circuitry of the integrated circuit fails to lock-on, the frames may not foe processed, giving rise to errors on the second network protocol layer. Therefore, if the signals associated with the second network protocol layer include any errors, method 300 proceeds to step 325. However, if there are no errors detected in the signals associated with the second network protocol layer, method 300 proceeds to step 340.

At step 340, method 300 determines if the signals that are associated with the third network protocol layer include any errors. Similar to the embodiment described above, when the network system is modeled after the OSI protocol model, the third network protocol layer may be a network layer. The network layer, typically, may include functional and procedural means for transferring variable-length data sequences from circuitry in one local area network system to circuitry in another local network system. It should be appreciated that the network system may be formed by multiple local network areas. In one exemplary embodiment, the transfer of variable-length sequence data may be performed by router circuitry. As described in FIG. 1, the router circuitry may include networking logic 140 in integrated circuit 110. The router circuitry may use various protocols, such as, Internet Protocol Version 4 (IPV4) and Internet Protocol Version 6 (IPV6).

The signals associated with the third network protocol layer include packets transferred from circuitry in a local network system to another circuitry in another local network system. Each packet may include control information and user data. The control information may include information that a network system needs for delivering the user data (e.g., source and destination addresses, error detection codes like checksums, and sequencing information). In one exemplary embodiment, errors in the signals associated with the third network layer may be identified by receiver circuitry of the integrated circuit by referring to the "alignment markers" or "synchronization words" in the packets received. If the "alignment markers" or the "synchronization words" include an erroneous bit, the signals associated with the third network protocol layer are deemed to be erroneous. Accordingly, if the signals associated with the third network protocol layer include any errors, method 300 proceeds to step 325.

If there is no error detected in the signals that are associated with the third network protocol layer, method 300 is complete. However, in an alternative embodiment, method 300 may further include steps that determine errors in signals that are associated with other network protocol layers (e.g., transport layers, session layers, presentation layers and application layers).

If errors are detected in any of the steps (e.g., steps 320, 330, and 340) method 300 may proceed to step 325 in FIG. 3A, which then leads to steps 350, 360, and 370 in FIG. 3B. At step 350, a detected problem is displayed. It should be appreciated that if the error was detected at step 320, the problem related to the first network protocol layer may be displayed. Accordingly, if the error was detected at step 330 or step 340, then the problem related to the second network protocol layer or the third network protocol layer may be displayed.

Subsequently, at step 360, a set of user instructions may be displayed for the displayed problem at step 350. Therefore, if the problem is related to the first network protocol layer, a set of user instructions related to the first network protocol layer may be displayed. Accordingly, if the problem is in signals related to the second or third network protocol layer, a set of user instructions for the second or third network protocol layer may be displayed.

Finally, at step 370, a specific set of status information associated with the problem may be displayed. If the problem is associated with the first network protocol layer, status information related to the first network protocol layer may be displayed. Accordingly, if the problem, is associated with the second or third network protocol layer, specific status related to the second or third network protocol layer may be displayed.

Still referring to FIGS. 3A and 3B, the detected problem, user instructions and the specific status information may be displayed on GUI 230 of test host 120 in FIG. 2. Method 300 may selectively display the problem and status Information as it takes advantage of the stacked layer in the network protocol layers. It should be appreciated that displaying status information this way may allow a user of test host 120 of FIG. 2 to easily debug the network system (e.g., network system ISO of FIG. 1).

Figure 4:
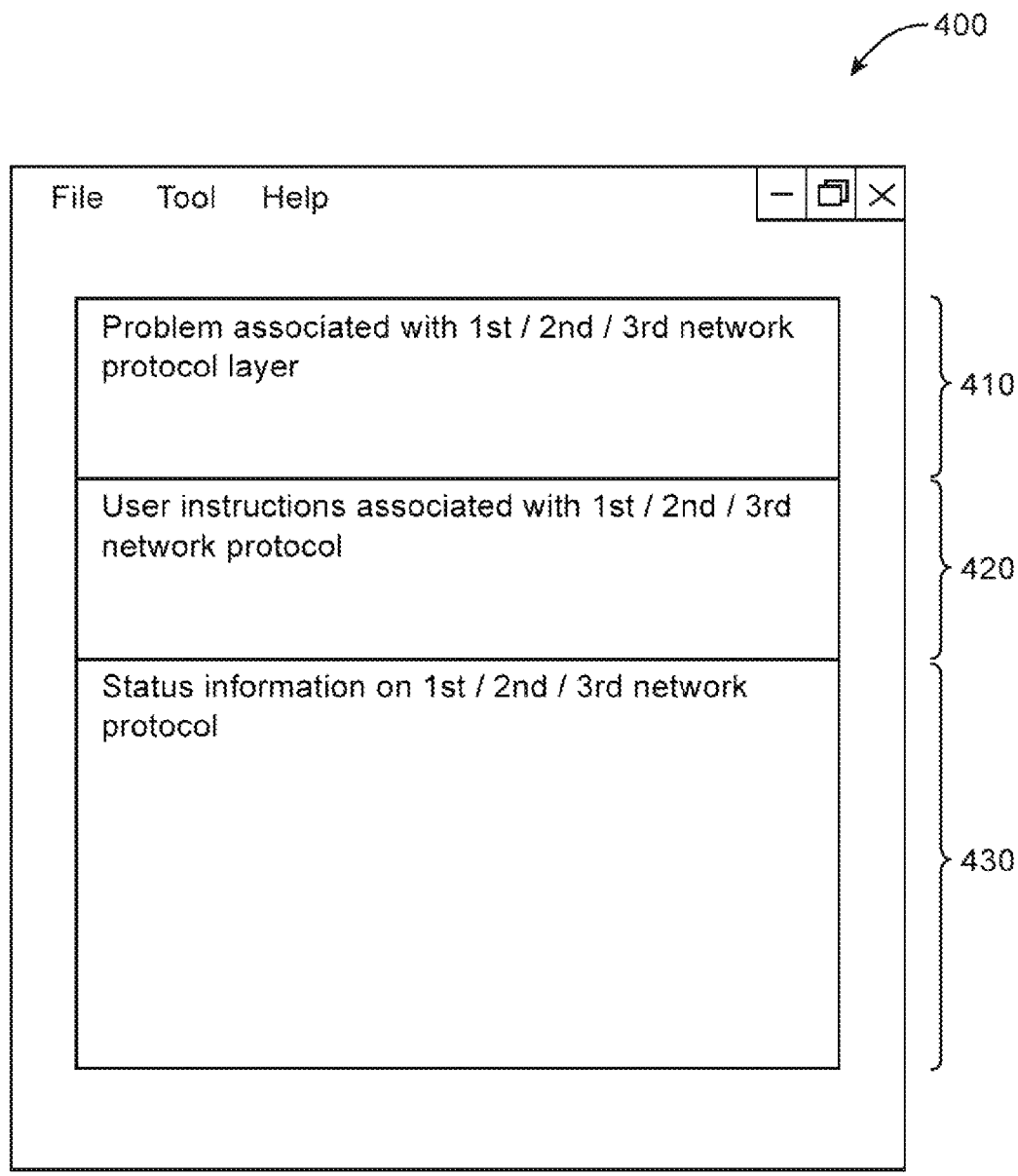
FIG. 4 shows a graphical user interface (GUI) in accordance with one embodiment of the present invention.

FIG. 4, meant to be illustrative and not limiting, illustrates a graphical user interface (GUI) 400 in accordance with one embodiment of the present invention. GUI 400 may be an implementation of GUI 230 in FIG. 2. GUI 400 includes a window frame and three sections 410, 420 and 430 for displaying information. Section 410 is a region that encompasses a top portion of GUI 400. Section 410 may display problems associated with the first, second or third network protocol layer. Section 420 is a region that encompasses a middle portion of GUI 400. Section 420 may display user instructions associated with problems associated with the first, second or third network protocol layer. Section 430 is a region that encompasses a lower portion of GUI 400. Section 430 may display specific status information related to the first, second or third network protocol layer. In one embodiment, the information displayed based on the problem, user instructions and status may depend on steps performed in method 300 of FIGS. 3A and 3B.

Figure 5:
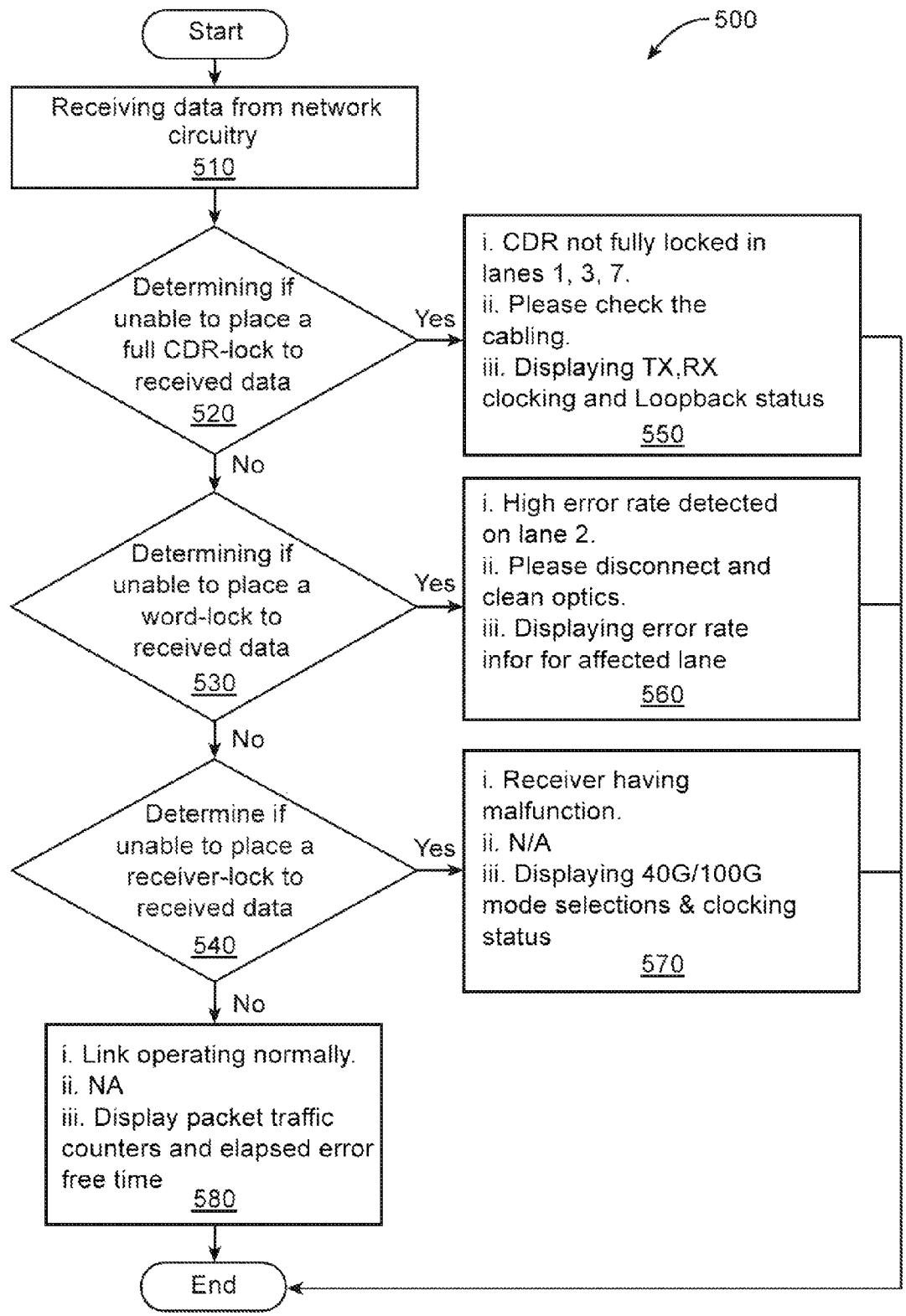
FIG. 5 shows an exemplary implementation of a method of processing signals received from a network system in accordance with one embodiment of the present invention.

FIG. 5, meant to be illustrative and not limiting, illustrates a method 500 for signal processing in accordance with one embodiment of the present invention. Method 500 illustrates a method to troubleshoot problems related to receiver circuitry on an integrated circuit (e.g., integrated circuit 110 of FIG. 1). Therefore, the description for method 500 may specifically relate to circuitry in the receiver circuitry (e.g., SERDES circuitry, CDR circuitry, PLL circuitry, etc). Method 500 includes three steps to determine an error according to a stacked network protocol layer (e.g., steps 520, 530, and 540), and an exemplary output display at steps 550, 560 and 570, respectively.

At step 510, a test host receives data related to the network system. The test host and the network system may be similar to test host 120 and network system 150 of FIG. 1. As an example, the test host may receive data from an integrated circuit, such as integrated circuit 110 of FIG. 1.

At step 520, the test host determines if the receiver circuitry is unable to lock to the received data (e.g., the CDR circuitry needs to be locked to the received data). The data may be received from other circuitry in the network system. It should be appreciated that the CDR circuitry, which forms a part of the circuitry in an integrated circuit, may be locked to the received data when it is able to identify the location of every one and zero in the received data. A failure to identify the location of all the ones and zeros may be deemed as an inability of the receiver circuitry to fully lock to the received data. Therefore, it should be appreciated that failure of the receiver circuitry to lock to the received data may foe similar as to having errors on the first, network protocol layer.

If the receiver circuitry is unable to lock to the received data, method 500 may proceed to step 550. At step 550, selected information based, on the outcome of step 520 is displayed through a GUI, for example, GUI 230 of FIG. 2 or GUI 400 of FIG. 4. In one embodiment, the information may include problems in the network system, steps needed to overcome the problems in the network system and the status signals. Therefore, at step 550, the GUI may display: (i) problems associated with the network system (e.g., CDR circuitry not fully locked at lanes 1, 3, 7 of the receiver circuitry), (ii) steps needed to overcome the problems (e.g., check cable connection), and (iii) the status of specific signals within the network system (e.g., display transmission, receiver clocking information, and loopback status information). It should be appreciated that the displayed information is specific (e.g., receiver circuitry unable to lock to the received data) enough to allow a user of test host system to easily troubleshoot any problems related to the network system. Method 500 ends after displaying the information at step 550.

However, if the receiver circuitry is able to lock to the received data, method 500 may proceed to step 530. At step 530, the test host determines if the receiver circuitry is unable to place a word-lock on the received data. It should be appreciated that a word-lock may be successfully placed when the receiver circuitry is able to identify a recurring sequence of bits in the received data. The recurring sequence of bits may be relatively long in one embodiment (e.g., 64-bit long). Word-lock may be different than the lock performed by CDR circuitry in step 520, as the lock performed by the CDR circuitry may lock-on with individual bits whereas word-lock may lock-on with a pattern of bits. Typically, the recurring sequence of bits may be referred as frames. Failure of placing a word-lock to the received data is deemed as an error in the receiver circuitry. Therefore, such a failure may be similar to having errors on the second network protocol layer as described in step 330 of FIG. 3A.

If the receiver circuitry is determined not to be able to place a word-lock on the received data, method 500 may proceed to step 560. Step 560 may display selected information related to step 530 through a GUI. Therefore, in the exemplary embodiment of FIG. 5, the GUI may display: (i) the specific lane with errors (e.g., a very high error rate in lane two) (ii) possible mitigating strategies (e.g., please disconnect and clean the fibre optics connected to the lane), and (iii) the error rate (e.g., the error rate for lane two). It should be appreciated that the information displayed in step 560 may be specific to the failure of the receiver circuitry to place a word-lock on the received signals. This allows the user of the test host system to easily debug the network system. Method 500 ends after step 560.

However, if the receiver circuitry is able to place a word-lock on the received data, method 500 may proceed to step 540. At step 540, the test host determines whether the receiver circuitry is unable to place a receiver-lock to the received data. It should be appreciated that the receiver-lock may be placed by identifying a sequence of bits within the received data that includes alignment markers and synchronized words received by the receiver circuitry. Generally, the sequence of bits may be relatively long (e.g., thousands of bits long). In one embodiment, the sequence of bits may be referred as packets. The receiver circuitry may fail to place a receiver-lock when the receiver circuitry is unable to identify the long sequence of bits. Therefore, failure by the receiver circuitry to place the receiver-lock may be similar to having errors on the third network protocol layer as shown in step 340 of FIG. 3A.

If the receiver circuitry is unable to place a receiver-lock to the received data, method 500 may proceed to step 570. At step 570, selected information related to step 540 may be displayed through a GUI. In the exemplary embodiment of FIG. 5, the GUI may display; (i) receiver having malfunction (ii) there is no course of corrective action, hence not available (NA) is stated, and (iii) displaying 40/100 Giga Bits Per Second (Gbps) mode selections and clocking status. The information displayed in step 570 may be specific to the third network protocol layer. Method 500 ends after step 570.

However, if the receiver circuitry is able to place a receiver-lock to the received data, method 500 may proceed to step 580. At step 580, the test host may display information related to the quality of transmission in the network system through a GUI. In the exemplary embodiment of FIG. 5, the GUI may display: (i) link is operating normally (ii) there is no course of corrective action (NA) and (iii) displaying packet traffic counters and elapsed error free time. Method 500 ends after displaying the information in step 580.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA® Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Although the foregoing invention has been described in some detail for the purposes of clarity, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The foregoing is merely illustrative of the principles of this invention and various modifications can be made by those skilled in the art without departing from the scope and spirit of the invention.

What is claimed is:

1. A method of operating test equipment that is coupled to network circuitry, comprising:
   receiving signals from the network circuitry, wherein the network circuitry comprises first and second network protocol layers;
   determining whether signals associated with the first network protocol layer exhibit any errors; and
   in response to determining that the signals associated with the first network protocol layer are erroneous, displaying status information for the first network protocol layer without displaying status information for the second network protocol layer.

2. The method in claim 1, wherein the first network protocol layer comprises a physical layer and wherein the second network protocol layer comprises a data link layer.

3. The method defined in claim 1, wherein the network circuitry comprises a serial-deserializer (SerDes) circuitry.

4. The method defined in claim 1, wherein the first and second network protocol comprises a protocol selected from the group consisting of: an Ethernet protocol, an Interlaken protocol and Scalable Serdes Framer Interface (SFI-S).

5. The method defined in claim 1, further comprising:
   in response to determining that the signals associated with the first network protocol layer are free of errors, determining whether signals associated with the second network protocol layer exhibit any errors.

6. The method defined in claim 5, further comprising:
   in response to determining that the signals associated with the second network protocol layer are erroneous, displaying status information for the second network protocol layer without displaying status information for the first network protocol layer.

7. The method defined in claim 1, wherein displaying status information for the first network protocol layer comprises displaying clocking information selected from the group consisting of: a transmit clock status, a receive clocking status, and a loopback status.

8. The method defined in claim 1, wherein displaying status information for the first network protocol layer comprises displaying error rate information.

9. The method defined in claim 1, wherein the network circuitry further comprises a communications link having a plurality of lanes, the method further comprising:
   in response to determining that the signals associated with the first network protocol layer are erroneous, identifying a portion of lanes in the plurality of lanes that are causing errors; and
   displaying status information for only the identified portion of lanes without displaying status information for remaining lanes other than the portion of lanes in the plurality of lanes that are free of errors.

10. A method of operating test equipment that is coupled to network circuitry, comprising:
- receiving signals from the network circuitry, wherein the network circuitry implements a network protocol stack having a plurality of network protocol layers;
- determining whether the received signals that are associated with one network protocol layer in the plurality of network protocol layers exhibit any errors; and
- in response to determining that the received signals associated with the one network protocol layer are erroneous, displaying status information of the one network protocol layer of the plurality of network protocol layers on a graphical user interface in the test equipment.

11. The method defined in claim 10, further comprising:
- in response to determining that the signals associated with the one network protocol layer are free of errors, determining whether the received signals that is associated with another network protocol layer in the plurality of network protocol layers exhibit any errors; and
- in response to determining that the received signals associated with the another network protocol layer are erroneous, displaying status information of the another network protocol layer on the graphical user interface.

12. The method defined in claim 10, further comprising:
- when one network circuitry is configured to implement a first type of network protocol stack, configuring the graphical user interface using a first arrangement; and
- when the network circuitry is configured to implement a second type of network protocol stack that is different than the first type of network protocol stack, configuring the graphical user interface using a second arrangement that is different than the first arrangement.

13. The method defined in claim 10, wherein the network circuitry further comprises a communications link having a plurality of lanes, the method, further comprising:
- in response to determining that the signals associated with the one network protocol layer are erroneous, identifying a portion of lanes in the plurality of lanes that are causing errors; and
- displaying status information for only the identified portion of lanes.

14. The method defined in claim 10, wherein displaying status information for only the one network protocol layer comprises displaying status information for only the one network protocol layer without displaying status information associated with any other network protocol layer in the plurality of network protocol layers.

15. The method defined in claim 10, further comprising;
- in response to determining that the signals associated with the one network protocol layer are erroneous, selecting a set of user instructions that are associated with the one network protocol; and
- displaying the set of the user instructions on the graphical user interface.

16. The method in claim 10, further comprising:
- providing control features on the graphical user interface in the test equipment, wherein the control features control the function of the network circuitry.

17. Non-transitory computer-readable storage media implemented on test equipment for displaying status information for network circuitry, comprising instructions for:
- receiving signals from the network circuitry with the test equipment, wherein the network circuitry includes a network protocol stack having a plurality of network protocol stack layers; and
- displaying status information for a single network protocol layer in the plurality of network protocol stack layers on a graphical user interface running on the test equipment.

18. The non-transitory computer-readable storage media defined in claim 17, further comprising instructions for:
- determining whether the received signals associated with the single network protocol layer are erroneous.

19. The non-transitory computer-readable storage media defined in claim 18, further comprising instructions for:
- in response to determining that the received signals associated with the single network protocol layer are erroneous, selecting a set of user instructions associated with the single network protocol; and
- displaying the set of the user instructions on the graphical user interface.

20. A computer system comprising:
- a central processing unit;
- a display;
- a keyboard; and
- non-transitory computer-readable storage media implemented on test equipment for displaying status information for network circuitry, comprising instructions for:
  - receiving signals from the network circuitry with the test equipment, wherein the network circuitry includes a network protocol stack having a plurality of network protocol stack layers; and
  - displaying status information for a single network protocol layer in the plurality of network protocol stack layers on a graphical user interface running on the test equipment.

* * * * *